July 22, 1969  H. E. LOWRY  3,456,281

BALL CASTER

Filed July 25, 1966

INVENTOR.
HUBERT E. LOWRY
BY Eugene F. Malin

United States Patent Office 3,456,281
Patented July 22, 1969

3,456,281
BALL CASTER
Hubert E. Lowry, 2195 NE. 55th St.,
Fort Lauderdale, Fla. 33308
Filed July 25, 1966, Ser. No. 567,557
Int. Cl. B60b 33/08
U.S. Cl. 16—25                       8 Claims

ABSTRACT OF THE DISCLOSURE

A ball caster comprising a ball, a body including connecting means, and holding means having a pocket therein and including a plurality of ribs supporting a plurality of fixed bearing members on said ribs to seat said ball and said fixed members making point contact with said ball.

---

This invention relates to an improved ball caster, and, more particularly, to a non-corrosive ball caster of non-complex design having a spherical roller mounted in a frame for the purpose of supporting a weighted object and for allowing the weighted object to be moved in any direction in a horizontal plane.

It is perhaps well known, that ball type casters theoretically provide many advantages over wheel type casters. Wheel type casters include a horizontal wheel axle as well as a vertical axle, which requires the wheel to be initially moved about the center line of the vertical axle in order to preset the horizontal wheel axle in the starting position or that position in which the horizontal wheel axle lies perpendicular to the wheel's projected path. Yet, commercial success of ball type casters has been hampered by high manufacturing costs, among other things. High costs have prevented ball type casters from successfully competing with wheel type casters. Also, various corrosive materials have been used in ball type casters, making them wholly unacceptable to the public in today's market. Corrosive materials such as iron, which oxidizes, ruins floors and carpets by marking or staining them. Coatings of various types have been used on ball casters but coatings give only temporary relief from the corrosive problem. Glass balls have been used to replace iron balls eliminating the corrosive problem. The glass balls, however, are destroyed easily by shock effects that are common when weighted objects are moved from one location to another. Rubber balls have been used to eliminate or damper shock effects, though, rubber balls have been found to be unsatisfactory because they expand within the holding cavity of a caster and thereby impede, if not prevent, rotation of the spherical ball. Also, casters requiring lubricants, such as oil, often stain rugs or floors. Further, various types of roller bearings have been used to allow the balls to rotate freely within their holding cavity. Roller bearings are not only costly but generally require lubrication. The lubricant invariably covers the entire ball with a film, which not only marks floors and carpets, but also provides an oil film between the caster ball and the floor which retards rotation of the ball over the floor by lowering the coefficient of friction between the ball and floor, thereby causing the ball to slide instead of roll over the floor.

The present invention relates to a new and improved ball-type caster that is non-corrosive and requires no lubrication. This caster includes a spherical ball, a retaining ring, and a caster body having a connecting portion by which the caster is attached to the leg of a weighted object, and a lower body portion for receiving the spherical ball. The connecting portion has a tapering stem with a bulbous end for releasably locking the caster to the leg of a weighted object. The lower body portion is cup-shaped, having a hollow interior with a downwardly projecting mouth. The interior bearing surface of the cup-shaped body portion is made of a nylon or plastic-like material, with a plurality of self-lubricating, nylon bearing points having little or no coefficient of friction, allowing the spherical ball to rotate freely in the cup. The retaining ring, having a centrally located opening that is less than the diameter of the spherical ball, is placed over the spherical ball and is connected to the body portion of the caster. The retaining ring prevents the ball from dropping out of the caster body and in the preferred embodiment also acts as a locking and cleaning device. The locking device creates a great frictional force between the retaining ring and the face or the surface of the spherical ball to prevent the spherical ball from rotating when the locking device is actuated. The outer edge of the opening in the retaining ring acts as a cleaning device for the ball by preventing foreign particles from entering the hollow portion of the caster body which contains the bearing surfaces.

It is an object of this invention to provide a simple, non-destructive means for moving heavy objects in any direction from a stationary position without having to initially actuate the means into a starting position.

Another object of this invention is to provide a non-corrosive, ball caster having bearing surfaces that require no lubrication.

Still another object of this invention is to provide a ball caster having non-movable bearing surfaces that require no lubrication.

An additional object of this invention is to provide a low cost, ball caster of non-complex design.

A further object of this invention is to provide a ball caster having a single means, for retaining the ball in the caster body, cleaning the ball, and locking the ball into a fixed position.

In accordance with these and other objects which will be apparent hereinafter, the invention will now be described with particular reference to the accompanying drawings illustrating the apparatus.

Figure 1:
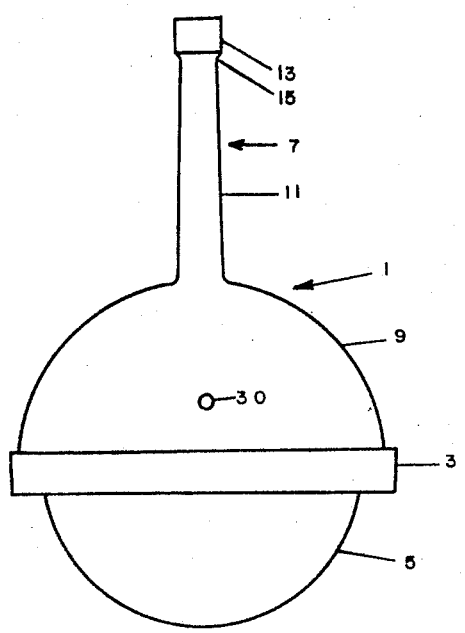
FIGURE 1 is a front elevation view, illustrating the assembled ball caster.

Referring now in detail to the drawings, where in the embodiment of the invention is shown, and referring, particularly to FIGURE 1, the preferred embodiment of the improved ball caster which includes a body portion, generally designated by numeral 1, a retaining ring 3, and a spherical-shaped ball 5. The body portion has an upper portion, generally designated by numeral 7, for connecting the ball caster to the leg of a weighted object, such as a furniture piece, and a lower portion 9 for receiving and containing the spherical ball 5.

The upper portion 7 includes a stem 11 attached at one end to the lower portion 9 of the caster body 1. The stem 11 is tapered with the largest diameter adjacent the lower portion 9 of the caster body 1. The distal end of the stem 7 is enlarged or bulbous, as shown at 13. Between the tapered portion of the stem 11 and the bulbous end 13 is a cam surface 15 that allows the upper portion 7 of the caster body to be withdrawn from a female holding means in the leg of a weighted object (not shown) by applying a downward force. The cam surface 15 normally holds the ball caster in the leg of the weighted object and prevents it from disengaging when the furniture piece is raised off the floor.

Figure 2:
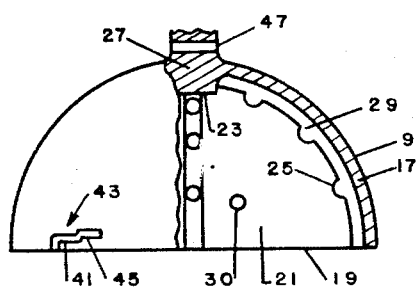
FIGURE 2 is a partial front elevation view, of the lower body portion of the caster body, partially broken away and illustrating the hollow interior.

The lower portion 9 of the ball caster is cup-shaped, the shell 17 has a generally spherical shape when viewed along the shaft of the stem 11 from the bulbous end. The mouth of the lower portion 9, generally designated as numeral 19, as shown in FIGURE 2, receives the spherical ball 5. The interior of the cup-shaped receiving cavity 21 includes bearing surface 23 and bearing points 25, upon which the spherical ball 5 rotates within the cavity. The nylon surface or point 23 is a self-lubricating, lifetime, bearing. The bearing surface 23 is the end of a raised platform 27, which is an extension of stem 11. This enlarged bearing surface 23 transfers the greatest portion of the dead weight of the weighted object to the spherical ball 5. Surface 23 may be concave, having a radii equal to or smaller than the radius of the ball 5, for positioning the center of the ball directly beneath the center line of stem 11. The bearing points 25 are on inner rims of a plurality of ribs 29 that are equally spaced in the cavity 21. The ribs 29 hold the spherical ball 5 directly beneath the stem 11 when the weighted object is moved in a horizontal plane. The ribs also reinforce the shell 17 in order to provide a more rigid structure. In the preferred embodiment the perpendicular distance from the bearing surface 23 to the mouth of the lower portion 9 of the caster body is equal to or greater than the radius of the spherical ball 5, in order to encompass at least half the surface of the ball. Holes 30 prevent the ball from being held in the cavity.

The body portion 1 of the caster is made from a non-corrosive material, such as plastic; the bearing surface and edges are constructed of a material having a low coefficient of friction, such as nylon. The entire body may be made of the bearing material, in order to lower manufacturing costs.

Figure 3:
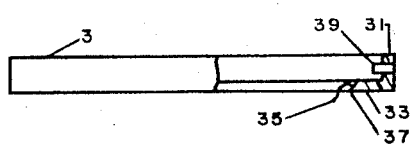
FIGURE 3 is a front elevation view, of the retaining ring, partially broken away and illustrating the connecting, cleaning, and locking means.

The retaining ring 3 has an L-shaped cross section, as shown in FIGURE 3. The vertical portion 31 of the L-shaped cross section is designed to overlay the exterior surface of the lower body 9 adjacent the mouth 19 when the retaining ring is in an assembled position as shown in FIGURE 1. The horizontal portion 33 of the L-shaped cross section projects inwardly toward the center of the mouth of the caster body 1. The distal surface 35 of the horizontal portion 33 is preferably arcuate, having a radius equal to the radii of the spherical ball 5. The horizontal portion 33 has a vertical thickness that allows the distal surface 35 to be positioned to hold the ball in the lower portion 9 of the caster body. The lower edge 37 acts as a cleaning means to prevent particles and foreign matter from entering the cavity 21 of the caster body when foreign matter adheres to the surface of the ball 5, thereby preventing destruction of the bearing surfaces and edges within the cavity. Retaining means 39, shown as a plurality of pins, are provided to connect the retaining ring 3 to the caster body. A plurality of slots 43 are provided in the caster body to receive the pins. Each retaining means or pin engages a surface 41 in a slot 43 in the lower portion 9 of the caster body. The retaining means may also act as locking means when the pins 39 are brought into engagement with surfaces 45 in slots 43.

When pins 39 engage surfaces 43, the distal surface 35 of the retaining ring frictionally bears against the surface of the ball 5, locking the ball into a fixed position to prevent rotation. By simply rotating the retaining ring 3, the pins may be placed in either the connecting or locking position.

In the preferred embodiment the spherical ball 5 is made out of a non-corrosive plastic or clay material. When a magnet 47 is placed in the stem 11 to replace the connecting means, iron or iron particles are placed within the ball's outer shell. The magnet attracts the ball into the cavity or cup and insures that the ball 5 does not fall out of the cup when the caster 1 is lifted from the floor.

The connecting means may also be replaced by a caster body having a long lower portion 9, with the mouth opening having a radius less than the radii of the ball 5. The perpendicular distance from the bearing surface 23, to the mouth 19 will be greater than the radius of the ball 5. The ball 5 must be forced into the cavity by expanding the mouth, thereafter, the mouth will contract around the ball to hold the ball in the cavity.

The spherical ball 5 may be replaced with a different colored ball within 60 seconds by simply rotating the retaining means and allowing the ball and the retaining means to drop from the lower portion 9 of the caster body, and then inserting the different colored ball into the cavity, replacing the retaining means and rotating the retaining means to connect it to the lower portion 9 of the caster body. The ball will drop out of the cavity since holes 30 allow air to pass freely into the cavity preventing the ball from being vacuum-locked in the cavity. The various colored balls allow the appearance of the caster to be changed at the whim of the user.

When the weighted object is to be located in one position for an extended period of time, the retaining ring 3 and ball 5 may be removed, thereafter the retaining ring may be connected to the lower portion of the caster to provide a flat base having a ring-shaped surface. Retaining ring 3 may be replaced by a base plate (not shown) that is shaped similar to the retaining ring 3, except that the base plate does not have a central opening, thereby, providing a maximum surface area to protect carpets and flooring.

The locking means is a non-complex means that does not detract from the beauty of the weighted object. The present locking means does not have levers connected to the locking mechanism to actuate the locking means, but only requires rotation of the retaining means 3. When levers are used, not only is traffic limited around the leg of a weighted object but the beauty of the weighted object is marred.

In use the spherical ball 5 is placed into the cavity 21 of the caster body 9. Thereafter the retaining ring 3 is connected to the caster body 9 to prevent the ball 5 from dropping out of the cavity. This can be accomplished in 60 seconds. The ball caster 1 is then connected to the leg of the weighted object by inserting the bulbous end 13 of the stem 11 into a socket in the leg of a weighted object. The weighted object may then be moved in any direction without moving the ball into a specific starting position since the rotational axis of the ball is not fixed in relation to the caster body. The low frictional or non-frictional, self-lubricating, lifetime bearing surfaces, points, or edges allow the ball to rotate without using lubricants such as oil. Once the weighted object reaches its destination the retaining ring can be easily rotated to lock the ball in a fixed position in relation to the caster body in order to fix the position of the weighted object to prevent unwanted movement.

The instant invention has been shown and described herein, in what is considered to be the most practical and preferred embodiment, it is recognized however, that departure may be made therefrom within the scope of the invention, which is therefore not to be limited to the details disclosed herein.

What is claimed is:
1. A ball caster comprising:
 a ball, and
 a body including connecting means for connecting the caster to a weighted object, and holding means having a pocket therein and including a plurality of fixed bearing members in said pocket to seat said ball with minimum surface contact between said ball and said body, said fixed members making point contact with said ball,
 each said fixed member having a hill-like portion with a peak for contacting said ball.
2. A ball caster as set forth in claim 1 wherein, said holding means including a plurality of ribs sup- porting a plurality of said fixed members on each rib.

3. A ball caster comprising:
a ball,
a body including connecting means for connecting the caster to a weighted object, and
holding means having a pocket therein and including a plurality of ribs supporting a plurality of fixed bearing members on said ribs to seat said ball with minimum surface contact between said ball and said body, said fixed members having peaked hill-like part making point-like contact with said ball, and
said ribs extend vertically downwardly in the pocket of said holding means.

4. A ball caster as set forth in claim 3 wherein, said fixed bearing members are low friction synthetic material.

5. In a ball caster as set forth in claim 4, wherein said synthetic material is a polyamide.

6. In a ball caster as set forth in claim 3, wherein said polyamide is a nylon.

7. A ball caster as set forth in claim 6 comprising, a ring-shaped ball cleaning retaining means for holding said ball in the pocket.

8. In a ball caster as set forth in claim 7 wherein said ball includes metal beneath its surface, and said retaining means includes a magnet to hold said ball within said holding means.

References Cited
UNITED STATES PATENTS

| | | | |
|---|---|---|---|
| 642,921 | 2/1900 | Reed | 16—24 |
| 818,080 | 4/1906 | Dunham | 16—27 |
| 956,969 | 5/1910 | Hussey | 16—24 |
| 1,224,294 | 5/1917 | Franzen | 16—26 |
| 1,582,795 | 4/1926 | Smith | 16—36 |
| 2,496,691 | 2/1950 | Berry | 292—251.5 |
| 2,731,663 | 1/1956 | Thompson | 292—251.5 |
| 3,349,426 | 10/1967 | Haydock | 16—18 |
| 3,239,022 | 3/1966 | Dolphin | 16—24 |

FOREIGN PATENTS 199,291   6/1923   Great Britain.

BOBBY R. GAY, Primary Examiner